United States Patent
Tsuchida

(10) Patent No.: US 6,586,086 B1
(45) Date of Patent: Jul. 1, 2003

(54) MAGNETIC RECORDING MEDIUM AND MAKING METHOD

(75) Inventor: Satoru Tsuchida, Tokyo (JP)

(73) Assignee: TDK Corporation, Tokyo (JP)

( * ) Notice: Subject to any disclaimer, the term of this patent is extended or adjusted under 35 U.S.C. 154(b) by 127 days.

(21) Appl. No.: 09/660,407

(22) Filed: Sep. 12, 2000

(30) Foreign Application Priority Data

Sep. 13, 1999 (JP) .......................................... 11-259551

(51) Int. Cl.[7] .................................................. G11B 5/72
(52) U.S. Cl. ........................ 428/323; 428/336; 428/408; 428/694 BP
(58) Field of Search ................................. 428/323, 336, 428/408, 694 BP

(56) References Cited

U.S. PATENT DOCUMENTS

| | | | | |
|---|---|---|---|---|
| 4,737,419 A | * | 4/1988 | Hilden et al. ............... | 428/695 |
| 4,755,426 A | * | 7/1988 | Kokai et al. ................ | 428/336 |
| 5,232,791 A | * | 8/1993 | Kohler et al. ............... | 428/694 |
| 5,712,028 A | | 1/1998 | Seki et al. | |
| 5,776,602 A | * | 7/1998 | Ueda et al. ................. | 428/332 |
| 5,780,135 A | * | 7/1998 | Kikitsu et al. ............. | 428/65.3 |
| 5,965,248 A | | 10/1999 | Saitoh et al. | |
| 6,127,039 A | | 10/2000 | Saitoh et al. | |

FOREIGN PATENT DOCUMENTS

| JP | 3-32139 | 5/1991 |
|---|---|---|
| JP | 9-50620 | 2/1997 |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

In a magnetic recording medium comprising a magnetic layer of 0.05–0.15 $\mu$m thick containing at least a magnetic powder and a binder on a non-magnetic substrate, a diamond-like carbon film of 5–30 nm thick is formed on the magnetic layer by plasma CVD, and a lubricating layer is formed thereon. The medium has improved friction properties and durability.

6 Claims, No Drawings

MAGNETIC RECORDING MEDIUM AND MAKING METHOD

This invention relates to a magnetic recording medium having a magnetic layer of the coating type and a method for preparing the same.

BACKGROUND OF THE INVENTION

In prior art magnetic recording media of the coating type, lubrication is achieved by incorporating a lubricant such as a fatty acid or fatty acid ester in the magnetic layer or by forming an intermediate layer of such a lubricant between the non-magnetic substrate and the magnetic layer such that the lubricant may emerge on the magnetic layer surface. Such magnetic recording media have long been utilized in the form of audio tape, video tape, computer data tape and disks. Because of the advanced high-vision TV broadcasting and computer data backup technology, the demand for high capacity tape is now increasing. It is desired to increase the data density of tape. One such approach is to produce the tape in thinner film form. Specifically, the approach intends to reduce the thickness of a base film and a coating layer which constitutes the tape for thereby increasing the recording density per volume. Reducing the thickness of the coating layer, however, gives rise to the problems that the coating layer is abraded by sliding contact with the magnetic head, resulting in clogging of the magnetic head, and still performance becomes poor due to shortage of the lubricant.

Means for improving the durability of the magnetic layer include the provision of a protective layer and a lubricating layer on the magnetic layer. In JP-B 3-32139, for example, a protective layer based on a UV or electron beam-curable resin is formed on a magnetic layer by coating, and cured by irradiating UV or electron beam, and thereafter, the magnetic layer is heat treated. The protective layer is about 0.2 $\mu$m thick in Examples. This method, however, encounters the difficulty of manufacture management in the event where the protective layer is formed to a thickness of less than 0.1 $\mu$m in order to reduce the spacing loss, because precise control of the concentration of the coating solution is necessary in order to form the protective layer to a uniform thickness.

Unlike the coating type magnetic recording media, metal thin film type magnetic recording media cannot adopt formulation means such as impregnating the magnetic recording layer with a lubricant, and instead, a lubricant layer or protective layer is provided on the metal thin film. Without a lubricant layer or protective layer, there are many problems including an increased coefficient of friction, unstable tape travel, and considerably low durability. It was then proposed to form a diamond-like carbon (DLC) film as the protective layer. The DLC film ensures the manufacture of a tape which provides lower friction than the coating type magnetic recording media. The DLC film is hard enough to undergo least wear by the head. Also the DLC film is effective for reducing the deposition of dust or debris that can cause dropouts.

The provision of the DLC film does impose little difficulty to the manufacture process of metal thin film type magnetic recording media because the metal thin film is formed by vacuum deposition techniques and the DLC film uses similar techniques.

Although the DLC film has many advantages as mentioned above, it is difficult in practice to use the DLC film as the protective layer in combination with the magnetic layer of the coating type. This is because a big difference exists in manufacture process between the DLC film and the magnetic layer.

Research is now made on a computer data tape drive having an MR head built therein. What is required for the magnetic tape to be read out satisfactorily by an MR head is (1) an appropriate magnetic flux density, (2) a smooth magnetic layer surface for noise reduction, and (3) the wear resistance of the magnetic layer surface in the event where a high hardness material such as Al—Ti—C is used as the head component.

The current technology of combining the MR head with the coating type magnetic tape has substantially overcome the above problems (1) and (2), but is unsatisfactory with respect to problem (3). It is thus desired to accomplish a lubricating effect or good friction properties and improve durability (such as wear resistance) without giving rise to the above problems (1) and (2).

SUMMARY OF THE INVENTION

An object of the invention is to provide a magnetic recording medium comprising a thin magnetic layer of the coating type, having improved friction properties and durability. Another object of the invention is to provide a method for preparing the magnetic recording medium.

It has been found that a coating type magnetic recording medium can be improved in durability, friction properties and surface smoothness and optimized in magnetic flux density by forming a diamond-like carbon film on a magnetic layer.

In a first aspect, the invention provides a magnetic recording medium comprising a non-magnetic substrate, a magnetic layer on the substrate containing at least a magnetic powder and a binder and having a thickness of up to 0.15 $\mu$m, a diamond-like carbon film on the magnetic layer having a thickness of 5 to 30 nm, and a lubricating layer on the diamond-like carbon film. Preferably, the diamond-like carbon film has been formed by plasma CVD, and the magnetic layer is free of a lubricant. The magnetic recording medium is typically used in combination with an MR head.

In a second aspect, the invention provides a method for preparing a magnetic recording medium comprising the steps of forming a magnetic layer containing at least a magnetic powder and a binder on a non-magnetic substrate to a thickness of up to 0.15 $\mu$m by coating, reducing the amount of low molecular weight matter in the magnetic layer, and thereafter, forming a diamond-like carbon film on the magnetic layer to a thickness of 5 to 30 nm by plasma CVD. Most often, the low molecular weight matter contains an organic solvent, and the step of reducing the amount of low molecular weight matter in the magnetic layer includes reducing the amount of the organic solvent to 20 ppm or below.

DESCRIPTION OF THE PREFERRED EMBODIMENT

The magnetic recording medium of the invention has a magnetic layer of the coating type on a non-magnetic substrate, a DLC film on the magnetic layer as a protective layer, and a lubricating layer thereon. It is a high density magnetic recording medium that is mainly used in the form of a magnetic tape, especially in combination with an MR head.

In order to enable high density recording and operate in combination with an MR head which is a magnetoresistance device, the magnetic layer should have a thickness of 0.15 $\mu$m or less. The provision of the DLC film as the protective film imparts to the medium lubricity and wear resistance and hence, durability enough to withstand the combined use with an MR head of high hardness material. The DLC film has smoothness enough to ensure satisfactory readout by an MR head while suppressing noise. Since the DLC film has a thickness of 5 to 30 nm, the medium has a minimized spacing loss and good reliability. On combined use with an MR head, the magnetic recording medium provides an appropriate magnetic flux density.

As a result, the magnetic recording medium of the invention has improved lubricity, a low friction coefficient, high durability, minimized spacing loss and satisfactory write/read characteristics.

The respective components of the magnetic recording medium are described below in detail as well as its manufacturing method.

DLC Film

The diamond-like carbon (DLC) film is provided as the protective film for imparting lubricity and wear resistance to the magnetic layer. The "diamond-like carbon" film used herein denotes a synthetic carbon film in which carbon atoms are bonded to high orders, specifically a hard carbon film having a refractive index of at least 1.9. For a material having a refractive index of such an order, its hardness can be approximated from its refractive index. For example, a refractive index of 1.9 corresponds to a Vickers hardness of 6,370 N/mm$^2$ (650 kg/mm$^2$). No upper limit is imposed on the refractive index although a refractive index of about 2.25 is usually the upper limit, which corresponds to a Vickers hardness of 29,400 N/mm$^2$ (3,000 kg/mm$^2$).

The carbon content of the DLC film is about 60 to 80 at % when the atomic ratio is expressed in percent. Additionally the film generally contains hydrogen. The film may further contain Si, N, O, F, etc. insofar as their content is 5 at % or less. The atomic ratio of hydrogen to carbon (H/C) is preferably from 0.25/1 to 0.66/1.

The DLC film can be formed by general vacuum thin film deposition techniques such as plasma CVD and sputtering. Especially when plasma CVD is used, a denser protective film can be formed through easier control of film quality and composition.

Referring to a typical example utilizing plasma CVD, the method of forming the DLC film is described. The system includes a vacuum chamber through which a web travels, the web being a non-magnetic substrate having a magnetic layer coated thereon. By means of a vacuum pump, the chamber is evacuated to a vacuum of $1.33 \times 10^{-3}$ Pa ($10^{-5}$ Torr) or lower. Then a hydrocarbon gas and optionally an additive gas are introduced into the chamber while controlling the reaction pressure to 133 Pa to 1.33 Pa ($10^{-2}$ Torr). The amount of such gases fed can be determined as appropriate depending on the volume of the chamber and the capacity of the vacuum pump.

The hydrocarbon gas used herein is not critical although a hydrocarbon which is gaseous at room temperature and atmospheric pressure is preferable for ease of handling. A choice is made of, for example, methane, ethane, propane, butane, pentane, ethylene, propylene, acetylene, and methylacetylene. Silane and nitrogenous gases are undesirable because some are toxic, some are corrosive, and some do not form a DLC film even when polymerized.

The additive gas which is optional is selected from among hydrogen, neon, helium and argon. The additive gas is added to the hydrocarbon gas in such a proportion that the molar ratio of additive gas to hydrocarbon gas may range from about 1/1 to about 0.01/1. With too higher a ratio, that is, if the amount of additive gas is excessive relative to the hydrocarbon gas, the deposition rate may become lower.

The power source for producing an electric discharge preferably has a frequency of 10 kHz to 450 kHz, and more preferably 50 kHz to 200 kHz. With a frequency of less than 10 kHz, long-term operation may be difficult. With a frequency of more than 450 kHz, the film may be less dense. A frequency approximate to direct current gives rise to the drawback that in the event of an abnormal discharge, the web can be perforated because of locally increased ion energy.

When the web travels during deposition, the web is carried along a drum equipped with cooling means such as a water cooled drum. If the web travels through the discharge space while it is kept afloat (not in contact with a mechanical carrier), the base film (non-magnetic substrate) can be thermally deformed and ions build up to prevent subsequent ions from depositing, forming a film of soft quality. As a consequence, the magnetic recording medium is not improved in characteristics.

The thus deposited DLC film has a thickness of about 5 to 30 nm. The choice of this film thickness eliminates the spacing loss problem and as a consequence, the magnetic recording medium is suitable and reliable for use as a high density medium and provides an optimum magnetic flux density on combined use with an MR head. If the film thickness exceeds 30 nm, the spacing loss is increased beyond the level suited for high density magnetic recording media. With a film thickness of less than 5 nm, on the other hand, a reliability problem will arise. Additionally, a DLC film with a thickness of less than 5 nm can cause the MR head to be magnetically saturated while a DLC film with a thickness of more than 30 nm will provide a less saturation magnetic flux at which MR head reading becomes difficult.

Another advantage of the DLC film is an improvement in surface roughness. Although the exact reason is not well understood, it is believed that since the starting material used in the fabrication of the DLC film is a low molecular weight material which is gaseous at room temperature, the resulting film is dense and that rough projections on the underlying magnetic layer surface are somewhat leveled off due to the etching effect during deposition.

Typically the magnetic recording medium on the magnetic layer side has a surface roughness of 1.8 to 3.0 nm as expressed in center line mean roughness Ra according to JIS B-0601.

Lubricating Layer

According to the invention, a lubricating layer containing a lubricant is formed on the DLC film for thereby enhancing the friction reducing effect and significantly improving durability in cooperation with the DLC film. These effects are not obtainable with only the DLC film.

The lubricant used in the lubricating layer may be selected from well-known lubricants commonly used in metal thin film type and coating type magnetic recording media. Illustrative examples include fatty acids and fatty acid esters, desirably those having a perfluoroalkyl group within a molecule (e.g., $C_{14}H_{29}COOC_2H_4C_8F_{17}$). For the detail of these lubricants, reference should be made to JP-A 9-016952, JP-A 9-312011 and JP-A 11-193389.

As a general rule, the lubricating layer containing a lubricant is pre-formed on the DLC film as by coating. However, it is only required that a layer of a lubricant exist on the DLC film of the magnetic recording medium when the medium is used in the form of a magnetic tape. Therefore, the lubricating layer need not necessarily be previously provided on the DLC film. An alternative acceptable design is such that the lubricant is delivered from the backcoat layer which is generally provided on the side of the non-magnetic substrate opposite to the magnetic layer.

In any of these embodiments, the lubricating layer which should exist on the DLC film on use of the magnetic recording medium preferably contains 0.5 to 10.0 mg of the lubricant per square meter of the medium. This range of lubricant coverage ensures the lubricity improving effect. A less lubricant coverage may be ineffective for improving lubricity. With an excessive lubricant coverage, the lubricity improving effect may be saturated and a spacing loss problem may arise.

Magnetic Layer

As long as the magnetic layer contains at least a magnetic powder and a binder, any of well-known materials and methods are applicable to the magnetic layer. Examples of the magnetic powder used herein include ferromagnetic metal magnetic powders such as elemental Fe, Co and Ni and alloys thereof, barium ferrite, and cobalt-doped γ-iron oxide.

Examples of the binder used herein include well-known thermoplastic resins, thermosetting resins, reactive resins and electron beam-sensitive modified resins. More illustratively, useful resins include vinyl chloride copolymers, butyral resins, phenoxy resins, epoxy resins, polyurethane resins, polyester resins, nitrocellulose, and rubbery resins such as butadiene rubber, alone or in admixture. Of these, a combination of a vinyl chloride copolymer with a polyurethane resin is especially preferred for the magnetic layer. Their proportion is not critical although the preferred weight ratio of vinyl chloride copolymer to polyurethane resin is from 10/90 to 90/10.

Preferably the magnetic powder and the binder are blended such that 10 to 20 parts by weight of the binder is present per 100 parts by weight of the magnetic powder.

The magnetic layer is formed by applying a coating solution or magnetic paint containing the magnetic powder, the binder, optional additives (e.g., an abrasive and dispersant), and a solvent.

The magnetic layer has a thickness of 0.15 $\mu$m or less because high density recording is possible and an appropriate magnetic flux density is available on the combined use with an MR head. A magnetic layer thickness of more than 0.15 $\mu$m causes magnetic saturation of the MR head which is an MR device and obstructs high density recording. Although no particular lower limit is imposed on the thickness of the magnetic layer, the lower limit of thickness is typically about 0.05 $\mu$m.

Since lubricity is provided by the DLC film and the lubricating layer thereon, there is no need to add the lubricant to the magnetic layer as needed in the prior art. Because of the presence of the DLC film, the addition of the lubricant to the magnetic layer does not exert any effect as found in the prior art. Still worse, the addition of the lubricant to the magnetic layer would rather become an obstruction to the formation of the DLC film as will be described later. Therefore, the magnetic layer should be free of a lubricant and if any, the content of a lubricant should be less than 100 ppm. In forming the magnetic layer, the invention avoids the positive addition of a lubricant to the coating solution.

If the magnetic layer contains low molecular weight matter, the low molecular weight matter can escape or degas from the magnetic layer in the subsequent DLC film depositing step involving evacuation to a vacuum of $1.33 \times 10^{-3}$ Pa ($10^{-5}$ Torr). This degassing causes process contamination (e.g., contamination within the vacuum chamber and efficiency loss of the vacuum pump). It is thus necessary to minimize the degassing amount.

Namely it is preferable to minimize the content of low molecular weight matter in the magnetic layer. It is desirable to keep as low as possible the content of a lubricant such as a fatty acid ester and a solvent and other liquid less polar additives used for coating, because these compounds have low hydrogen bonding forces and form weak bonds with inorganic materials in the magnetic layer. In particular, the content of residual solvent should desirably be 20 ppm or less.

Non-magnetic Substrate

The non-magnetic substrate used herein may be made of any resin selected from polyethylene terephthalate, polyethylene naphthalate, aramid, polyimide, polyamide imide, and polyamide, though not limited thereto. The substrate is preferably about 2 to 8 $\mu$m thick.

Backcoat Layer

If desired, a backcoat layer is provided on the side of the non-magnetic substrate opposite to the magnetic layer for the purpose of assisting in stable travel of the tape. Typically the backcoat layer contains carbon black and a binder as main components and is also effective in improving electric resistance, friction and storage stability. The binder may be selected from the same examples as described above in conjunction with the magnetic layer.

If the backcoat layer is coated prior to the provision of the DLC film as the protective film, the backcoat layer is also desired to have minimum contents of residual solvent and lubricant. The backcoat layer which has been processed such that the residual solvent and lubricant content is minimized, however, can be less durable or less effective to travel performance. It is then preferred to form the backcoat layer after the formation of the DLC film. And in this case, the backcoat layer is allowed to have an ordinary content of residual solvent.

Preferably the backcoat layer is about 0.2 to 0.8 $\mu$m thick.

Each of the magnetic layer, backcoat layer and DLC film that constitute the magnetic recording medium of the invention is generally a single layer although it may have a multilayer structure of two or more layers. In the latter case, the total thickness of multiple layers should fall within the above-defined range.

With respect to the general information about the magnetic recording medium of the invention and its manufacturing method, reference should be made to JP-A 9-270116, for example.

EXAMPLE

Examples of the invention are given below by way of illustration and not by way of limitation. All parts are by weight.

Example 1

Preparation of Magnetic Paint

|  | Parts by weight |
| --- | --- |
| Fe base ferromagnetic alloy magnetic powder (Hc 190 kA/m = 2400 Oe, σs 145 $Am^2$/kg = 145 emu/g) | 100 |
| Vinyl chloride copolymer (MR110, Nippon Zeon K.K.) | 9 |
| Polyurethane resin (TS9121, Toyobo K.K.) | 4 |
| Polyurethane resin (TS7400, Toyobo K.K.) | 3 |
| α-$Al_2O_3$ (mean particle size 0.1 μm) | 3 |
| α-$Al_2O_3$ (mean particle size 0.08 μm) | 5 |
| Anionic surfactant (RE610, Toho Chemical K.K.) | 2 |
| Methyl ethyl ketone | 50 |
| Toluene | 50 |
| Cyclohexanone | 150 |

The above ingredients were mixed in a kneader and dispersed in a sand mill. To the mixture were added 100 parts of methyl ethyl ketone, 100 parts of toluene, 250 parts of cyclohexanone, and 25 parts based on the resin ingredients of a curing agent Colonate L. After agitation and mixing, the mixture was passed through a filter HT04 (Lockitechno Co.), yielding a magnetic paint.

Preparation of Backcoat Composition

|  | Parts by weight |
| --- | --- |
| Carbon black (mean particle size 80 nm) | 75 |
| Carbon black (mean particle size 20 nm) | 25 |
| α-iron oxide (mean particle size 100 nm) | 3 |
| Vinyl chloride copolymer | 40 |
| Polyurethane | 60 |
| Methyl ethyl ketone | 800 |
| Toluene | 480 |
| Cyclohexanone | 320 |

A polyethylene naphthalate (PEN) film of 6.5 μm thick (having a center line mean roughness Ra<2 nm on the magnetic layer side) was treated with a corona discharge. The magnetic paint was applied to the PEN film so as to give a dry thickness of 0.15 μm, oriented in a magnetic field, dried, and calendered.

On the magnetic layer, a DLC film was deposited by plasma CVD. The reaction gas used herein was a mixture of ethylene and Ar in a flow rate ratio of 2:1. Using a power supply of 100 kHz, the DLC film was deposited to a thickness of 10 nm. It is noted that the thickness of the DLC film was determined by a calibration curve fitting procedure based on standard samples.

It is noted that the solvent content of the magnetic layer was measured prior to the DLC film deposition. After the magnetic layer was found to have a solvent content of 15 ppm, the process proceeded to the DLC film deposition step.

The content of residual solvent was measured by cutting the magnetic layer-bearing film into a strip sample sized ½ inch (1.27 cm) by 3 m. The sample was sealed in a 25-ml vial, which was heated at 120° C. for 60 minutes. The vapor in the vial was sampled out and the quantities of solvents were measured by gas chromatography. The instrument used was HSS-2A head space gas chromatograph (column PEG20M) by Shimadzu Mfg. K.K. Using previously determined calibration curves, the residual amount of each solvent was determined, from which the total amount of residual solvents was calculated. The calibration curve was determined by diluting each solvent with ethyl cellosolve to 1/10, admitting 0.5 μl, 1.0 μl, 2.0 μl and 4.0 μl of the dilution into separate vials, heating at 120° C. for 60 minutes, and measuring the amount of the solvent. The weight of the magnetic layer coating was the weight of the entire coated sample minus the weight of the PEN film.

The DLC film had a refractive index of 2.1 as measured by the method to be described later. The DLC film as deposited had an atomic ratio of hydrogen/carbon of 0.3 as measured by elastic recoil detection analysis (ERDA).

On the surface of the PEN film opposite to the magnetic layer-bearing surface, the backcoat composition was coated so as to give a dry thickness of 0.5 μm and thermoset at 60° C. for 24 hours. Thereafter, a solution of a lubricant ($Cl_4H_{29}COOC_2H_4C_8F_{17}$) in a mixture of methyl isobutyl ketone and heptane was coated onto the magnetic layer-bearing side and dried so as to give a coverage of 5 mg/$m^2$.

A magnetic recording medium was fabricated in this way.

Example 2

A magnetic recording medium was fabricated as in Example 1 except that the DLC film was 30 nm thick.

Example 3

A magnetic recording medium was fabricated as in Example 1 except that the DLC film was 5 nm thick.

Comparative Example 1

A magnetic recording medium was fabricated as in Example 1 except that the DLC film was omitted.

Comparative Example 2

A magnetic recording medium was fabricated as in Example 1 except that 1 part of stearic acid and 1 part of butyl stearate were added per 100 parts of the magnetic powder in the magnetic paint, and the DLC film and the lubricating layer of lubricant ($C_{14}H_{29}COOC_2H_4C_8F_{17}$) were omitted.

Comparative Example 3

A magnetic recording medium was fabricated as in Example 1 except that the DLC film was 3 nm thick.

Comparative Example 4

A magnetic recording medium was fabricated as in Example 1 except that the DLC film was 40 nm thick.

Comparative Example 5

A magnetic recording medium was fabricated as in Example 1 except that the DLC film was 50 nm thick.

These magnetic recording media were evaluated for several properties by the following procedures. The results are shown in Table 1.

Still Performance

A 8-mm video deck was used which was equipped with a rotary head having mounted thereon a Ni—Fe MR head coated with an Al—Ti—C layer as a head component. Measurement was made in an environment of 3° C. and RH 5%.

Coefficient of Friction

The tape was wrapped about 90° around a stainless steel pin with a diameter of 3 mm, and a weight (Ti) of 20 g was suspended from one end of the tape. The tape was repeatedly moved back and forth over a stroke of 5 cm at a speed of 1,800 mm/min. At the 300th pass, the load (T2) was measured. A coefficient of friction ($\mu$) was determined by the following expression.

$$\mu = (2/\pi) \cdot \ln(T1/T2)$$

Output

An MR head (write side: MIG head, gap: 0.15 $\mu$m, read side: Ni—Fe MR head) by TDK Corporation was attached to a spin stand, and measurement was made. The results are expressed in relative values based on Comparative Example 2.

Refractive Index and Film Thickness

A DLC film was deposited on a silicon wafer under the same conditions as in Example 1. Using an ellipsometer (Mizojiri Kougaku Kogyousho), the DLC film was measured for refractive index and thickness. As previously described, the hardness of a DLC film can be determined from its refractive index. Specifically, the refractive index of a DLC film is measured by means of an ellipsometer. Separately, the Vickers hardness of the same is measured by means of a micro-hardness meter (NEC K.K.). From these data, a calibration curve is previously drafted. Then a hardness is known from a refractive index.

Surface Roughness

Using a Talystep system (Taylor Hobson Co.), a center line mean roughness Ra was measured according to JIS B-0601. The instrument parameters were a filter: 0.18–9 Hz, probe: 0.1×2.5 $\mu$m stylus, probe pressure: 0.02 mN (2 mg), measuring speed: 0.03 mm/sec, and measuring length: 500 $\mu$m.

TABLE 1

| Magnetic recording medium | DLC film Thickness (nm) | Refractive index | Hardness (N/mm$^2$) | Coefficient of friction | Still life (hr) | Output (dB) | Ra (nm) |
| --- | --- | --- | --- | --- | --- | --- | --- |
| E 1 | 10 | 2.1 | 11760 | 0.19 | 45 | −0.1 | 2.1 |
| E 2 | 30 | 2.1 | 11760 | 0.19 | 57 | −0.3 | 2.2 |
| E 3 | 5 | 2.1 | 11760 | 0.18 | 40 | 0 | 2.1 |
| CE 1 | 0 | — | — | 0.48 | 0.5 | — | 2.1 |
| CE 2 | 0 | — | — | 0.34 | 4.5 | 0 | 1.9 |
| CE 3 | 3 | 2.1 | 11760 | 0.18 | 12 | 0 | 2.1 |
| CE 4 | 40 | 2.1 | 11760 | 0.2 | >60 | −0.8 | 2.2 |
| CE 5 | 50 | 2.1 | 11760 | 0.21 | >60 | −1.5 | 2.2 |

As seen from Table 1, the magnetic recording media provided with a DLC film according to the invention (Examples 1 to 3) have a significantly low coefficient of friction as compared with conventional coating type magnetic recording media (Comparative Example 2). With respect to the still performance under repetitive sliding contact with the magnetic head, the still life is extended, indicating a significantly improved sliding strength. Thicker DLC films are undesirable because of output losses. Too thin DLC films are less durable.

Comparative Example 6

A magnetic recording medium was fabricated as in Example 1 except that the lubricating layer on the magnetic layer was omitted. The same properties as above were similarly determined, of which the coefficient of friction, still, output and Ra are shown below.

| | |
| --- | --- |
| Coefficient of friction | 0.32 |
| Still | 1.0 hour |
| Output | 0 dB |
| Ra | 2.2 nm |

It is apparent that the magnetic recording medium without the lubricating layer shows poor still performance as compared with conventional magnetic recording media (Comparative Example 2).

There has been described a magnetic recording medium having improved friction properties and durability.

Japanese Patent Application No. 11-259551 is incorporated herein by reference.

Reasonable modifications and variations are possible from the foregoing disclosure without departing from either the spirit or scope of the present invention as defined by the claims.

What is claimed is:

1. A magnetic recording medium comprising
   a non-magnetic substrate,
   a magnetic layer on said substrate containing at least a magnetic powder and a binder and having a thickness of up to 0.15 µm,
   a diamond-like carbon film on said magnetic layer having a thickness of 5 to 30 nm, and
   a lubricating layer on said diamond-like carbon film;
   wherein said magnetic recording medium has on a magnetic layer side thereof a surface roughness of 1.8–3.0 nm as expressed in center line mean roughness Ra.

2. The magnetic recording medium of claim 1 wherein said diamond-like carbon film has been formed by plasma CVD.

3. The magnetic recording medium of claim 1 wherein said magnetic layer is free of a lubricant.

4. The magnetic recording medium of any one of claims 1 to 3 which is used in combination with an MR head.

5. A method comprising preparing the magnetic recording medium of claim 1 comprising the steps of:
   forming a magnetic layer containing at least a magnetic powder and a binder on a non-magnetic substrate to a thickness of up to 0.15 µm by coating,
   reducing the amount of low molecular weight matter in said magnetic layer, and thereafter, forming a diamond-like carbon film on said magnetic layer to a thickness of 5 to 30 nm by plasma CVD.

6. The method of claim 5 wherein the low molecular weight matter contains an organic solvent, and the step of reducing the amount of low molecular weight matter in said magnetic layer includes reducing the amount of the organic solvent to 20 ppm or below.

* * * * *